US010372208B2

(12) United States Patent
Skogo et al.

(10) Patent No.: US 10,372,208 B2
(45) **Date of Patent: *Aug. 6, 2019**

(54) POWER EFFICIENT IMAGE SENSING APPARATUS, METHOD OF OPERATING THE SAME AND EYE/GAZE TRACKING SYSTEM

(71) Applicant: Tobii AB, Danderyd (SE)

(72) Inventors: Marten Skogo, Danderyd (SE); Henrik Jonsson, Stockholm (SE); Mattias O. Karlsson, Stockholm (SE); Mattias Kuldkepp, Sollentuna (SE); John Elvesjo, Stockholm (SE); Ingemar Mattias Karlsson, Vallentuna (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,946

(22) Filed: Nov. 8, 2017

(65) Prior Publication Data

US 2018/0067551 A1 Mar. 8, 2018

Related U.S. Application Data

(63) Continuation of application No. 15/336,552, filed on Oct. 27, 2016, now Pat. No. 9,846,481, which is a (Continued)

(30) Foreign Application Priority Data

Apr. 29, 2013 (GB) .................................. 1307724.3

(51) Int. Cl.
*G06F 3/01* (2006.01)
*H04N 13/383* (2018.01)
(Continued)

(52) U.S. Cl.
CPC .............. *G06F 3/013* (2013.01); *G06F 1/325* (2013.01); *G06F 3/0304* (2013.01);
(Continued)

(58) Field of Classification Search
CPC ........ G06F 3/013; G06F 1/325; G06F 3/0304; H04N 5/23212; H04N 5/23241;
(Continued)

(56) References Cited

U.S. PATENT DOCUMENTS 6,526,159 B1 * 2/2003 Nickerson .............. G06F 3/013 345/156
6,907,536 B2 6/2005 Takahashi et al.
(Continued)

FOREIGN PATENT DOCUMENTS

CN 101860682 A 10/2010
CN 102510450 A 6/2012
CN 102567737 A 7/2012

OTHER PUBLICATIONS

International Search Report and Written Opinion for GB1307724.3 dated Oct. 17, 2013.
(Continued)

*Primary Examiner* — Nhan T Tran
(74) *Attorney, Agent, or Firm* — Moore & Van Allen PLLC; W. Kevin Ransom

(57) ABSTRACT

An image sensing apparatus has a light sensitive area and a control unit. The light sensitive area registers image data in response to an incoming amount of light, and is operable in an active mode wherein image data can be read out there from as well as in a standby mode wherein image data cannot be read out. The control unit produces a control signal setting the light sensitive area to operate in the active mode and the standby mode respectively in a cyclic manner during an operation period, which preferably encompasses
(Continued)

multiple data frame read-outs of image data from the light sensitive area.

26 Claims, 2 Drawing Sheets

Related U.S. Application Data continuation of application No. 14/250,142, filed on Apr. 10, 2014, now Pat. No. 9,509,910.

(51) Int. Cl.

| | |
|---|---|
| ***H04N 5/232*** | (2006.01) |
| ***H04N 5/376*** | (2011.01) |
| ***H04N 5/378*** | (2011.01) |
| ***G06F 1/32*** | (2019.01) |
| ***G06F 1/3234*** | (2019.01) |
| ***G06F 3/03*** | (2006.01) |

(52) U.S. Cl.

CPC ..... *H04N 5/23212* (2013.01); *H04N 5/23241* (2013.01); *H04N 5/23245* (2013.01); *H04N 5/378* (2013.01); *H04N 5/3765* (2013.01); *H04N 13/383* (2018.05); *G03B 2213/025* (2013.01)

(58) Field of Classification Search

CPC .. H04N 5/23245; H04N 5/3765; H04N 5/378; H04N 13/0484

See application file for complete search history.

(56) References Cited

U.S. PATENT DOCUMENTS

| | | | | |
|---|---|---|---|---|
| 7,015,965 | B2 | 3/2006 | Asada et al. | |
| 7,379,560 | B2 * | 5/2008 | Bradski | G06F 1/3203 382/103 |
| 8,330,853 | B2 | 12/2012 | Ise | |
| 9,509,910 | B2 | 11/2016 | Skogo et al. | |
| 2001/0028730 | A1 * | 10/2001 | Nahata | G06K 9/00597 382/117 |
| 2006/0232825 | A1 | 10/2006 | Freyman | |
| 2008/0111833 | A1 | 5/2008 | Thorn et al. | |
| 2010/0079508 | A1 * | 4/2010 | Hodge | G06F 1/3206 345/697 |
| 2014/0043227 | A1 * | 2/2014 | Skogo | G06F 1/325 345/156 |
| 2014/0139631 | A1 * | 5/2014 | Mark | H04N 5/23241 348/46 |
| 2014/0320688 | A1 | 10/2014 | Skogo et al. | |
| 2015/0220768 | A1 * | 8/2015 | Ronnecke | G06K 9/00362 348/78 |

OTHER PUBLICATIONS

European Search Report for European Application No. 14165083.8 dated Jan. 14, 2016.

Chinese Office Action for Application No. 20141078305.1 dated Jan. 19, 2018.

* cited by examiner

POWER EFFICIENT IMAGE SENSING APPARATUS, METHOD OF OPERATING THE SAME AND EYE/GAZE TRACKING SYSTEM

CROSS-REFERENCE TO RELATED APPLICATION(S)

The present application is a continuation application of U.S. patent application Ser. No. 15/336,552, filed Oct. 27, 2016, the contents of which are hereby incorporated by reference herein, which in turn is a continuation of U.S. patent application Ser. No. 14/250,142, filed Apr. 10, 2014, which issued as U.S. Pat. No. 9,509,910 on Nov. 29, 2016, which in turn claims priority to GB Patent Application 1307724.3 filed Apr. 29, 2013; the contents of both of which are also incorporated herein by reference in their respective entirety.

FIELD OF THE INVENTION

The present invention relates generally to solutions for registering image data using one or more of an image sensing apparatus, an eye/gaze tracking system, a method, or computer software.

THE BACKGROUND OF THE INVENTION AND PRIOR ART

In portable, battery powered, devices it is vital to economize the energy resources. Therefore, minimizing the required amount of power is always a major concern when designing portable electronic apparatuses, such as mobile telephones and laptops. In these apparatuses, any integrated camera is often one of the larger energy consumers. This is especially true if the camera has a large image sensor and/or if it is used to capture moving images, i.e. video data. Further, there is a trend to include eye-tracking based solutions in portable devices. An eye/gaze tracking system is associated with especially demanding energy requirements because, here, high-resolution video capturing must normally be combined with data processing tasks of relatively high intensity.

To reduce the energy consumption in portable devices various solutions are known. For instance, US 2010/0079508 describes an electronic device with gaze detection capabilities, wherein a power management scheme is applied, which is based on whether or not a user's gaze is detected. In the absence of a user looking at the device, e.g. the display screen may be turned off.

US 2008/0111833 describes another eye-tracking related solution. Here, the display brightness is adjusted based on where the user's gaze is estimated to be located. Thus, a screen region around the gaze point is made relatively bright while remaining areas of the screen are darker.

U.S. Pat. No. 7,379,560 discloses a solution for monitoring human attention in dynamic power management. Here, an image-capturing device is used to analyze a user's face and learn his/her behavior. When the system determines that the user does not pay attention to the display, the power consumption of one or more components in the system is reduced.

U.S. Pat. No. 6,526,159 reveals a solution, wherein resources and power are managed based on eye tracking. Specifically, an orientation of an eye is determined, and on the basis thereof, the operating system changes the resources allocated to a display device.

Moreover, it is generally known that a camera can be set in an active mode or a standby mode, where the latter is associated with very low energy consumption. When set in the standby mode, the start-up delay until the camera may start capturing image data is very short compared to if the camera had been shut off completely. Consequently, the standby mode is useful when the camera is needed intermittently with short notice during limited periods. In continuous operation, however, the active mode is the only option.

Thus, there exist means, e.g. eye-tracking based, to reduce the power consumption in general mobile devices as well as in cameras. Nevertheless, there is yet no efficient solution for lowering the energy requirements of an eye tracking system as such in steady-state operation.

SUMMARY OF THE INVENTION

The object of the present invention is to solve the above problem, and thus offer an image sensing apparatus generally suitable for low-power applications.

It is also an object of the invention to provide a power-efficient eye/gaze tracking system.

According to one aspect of the invention, the objects are achieved by the initially described data processing unit, wherein the control unit is configured to produce the control signal such that the light sensitive area operates in the active mode and the standby mode in a cyclic manner during an operation period.

This image sensing apparatus is advantageous because it enables tailoring the use of the light sensitive area, such that it only delivers data at the specific moments when this data is actually required by the application for which the image sensing apparatus is used. Thus, the average energy consumption can be made very low.

According to one preferred embodiment of this aspect of the invention, the image sensing apparatus has an output interface, which is configured to deliver output image data from the light sensitive area. Specifically, the output interface is arranged to deliver the image data on a data-frame format, where one data frame represents readout of the image data having been registered by the light sensitive area during a capture time (or so-called exposure). When capturing video data, this means that the light sensitive area is configured to feed a sequence of data frames through the output interface at a given frame rate, e.g. 24, 25, 30 or 60 Hz. Here, the control unit is configured to produce the control signal so that, the operation period extends over at least one capture time (i.e. when the light sensitive area operates in the active mode) and at least two periods during which the light sensitive area operates in the standby mode. Thereby, even if the image sensing apparatus is used in continuous operation for generating a video file, its average energy consumption becomes much lower than in the traditional case.

According to another preferred embodiment of this aspect of the invention, the operation period extends over at least two capture times during which the light sensitive area operates in the active mode. Further, the at least two capture times are separated by a respective delay period during which the light sensitive area operates in the standby mode. This operation scheme combines the advantages of low energy consumption with a high degree of flexibility.

According to yet another preferred embodiment of this aspect of the invention, the light sensitive elements of the light sensitive area are arranged in a matrix having a first number of columns and a second number of rows. Moreover, the light sensitive area is controllable to exclusively read out image data to the output interface which have been registered by at least one subset of the first number of columns and/or the second number of rows (e.g. from a so-called region of interest, ROI). The control unit is further configured to produce the control signal so that the at least one subset of image data is fed to the output interface when the light sensitive area operates in the active mode. In the remaining time, the light sensitive area preferably operates in the standby mode. Hence, substantial amounts of energy can be saved.

According to an additional preferred embodiment of this aspect of the invention, prior to the operation period, the control unit is configured to produce the control signal so that the light sensitive area operates in the active mode during an unbroken period of time exceeding a typical capture time associated with a full readout of image data from the light sensitive area. Thus, no energy is saved. However, in order to determine which area to select as the above-mentioned subset, initially, it may be necessary to register full frame data for analysis reasons.

Analogously, if for example the eye-tracking is lost temporarily, it may be necessary to repeat this search procedure. Therefore, according to a further preferred embodiment of the invention, after the operation period, the control unit is configured to produce the control signal so that the light sensitive area again operates in the active mode during an unbroken period of time exceeding the typical capture time associated with a full readout of image data from the light sensitive area.

According to a further preferred embodiment of this aspect of the invention, the light sensitive area contains a set of light sensitive elements that are arranged in a first number of columns and a second number of rows. Here, the light sensitive area is controllable to read out image data to the output interface such that data from two or more light sensitive elements are combined with one another to form a common data unit. Consequently, a total number of said data units fed to the output interface is less than the first number times the second number, say a fraction two or four of this product.

According to another aspect of the invention, the object is achieved by the eye/gaze tracking system described initially, wherein the control unit is configured to produce the control signal, so that the selected subset of image data represents the image of at least one eye of the subject. Thereby, highly energy-efficient eye/gaze tracking can be effected, which inter alia, is suitable for integration in portable devices, such as smartphones, laptop computers, tablet computers, ultrabooks, all-in-one desktop computers or wearable eye tracking devices with near-to-the eye display and/or digital glasses with forward facing camera (e.g. similar to Google Glass™). The proposed eye/gaze tracking system may also be integrated into a motor vehicle, such as a car.

According to yet another aspect of the invention, the object is achieved by the method described initially, wherein the control signal is produced such that the light sensitive area operates in the active mode and the standby mode in a cyclic manner during an operation period. The advantages of this method, as well as the preferred embodiments thereof, are apparent from the discussion above with reference to the proposed apparatus.

According to a further aspect of the invention the object is achieved by a computer program product, which is loadable into the memory of a computer, and includes software adapted to implement the method proposed above when said computer program product is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
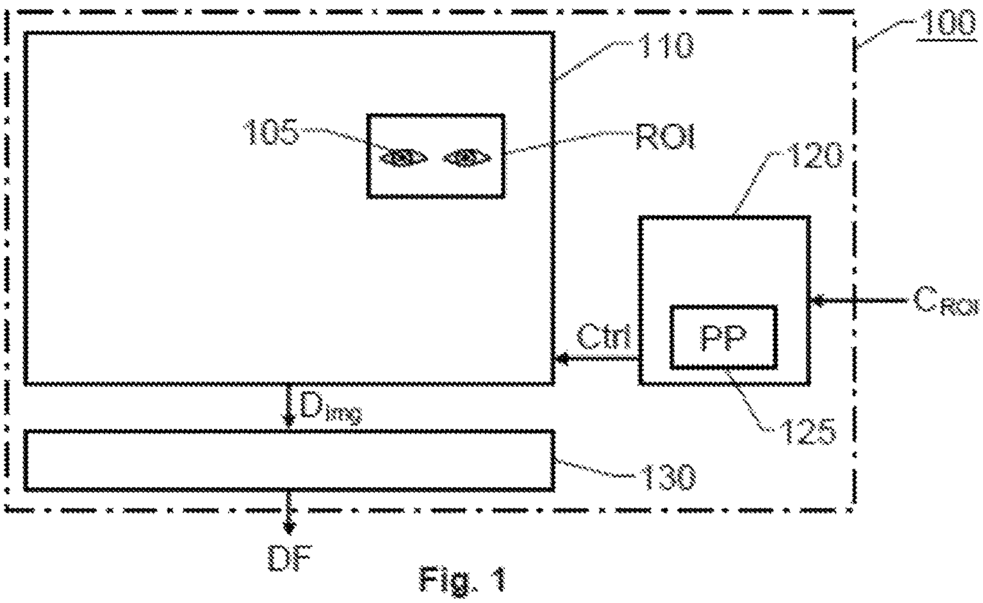
FIG. 1 shows the elements of an image sensing apparatus according to one embodiment that are relevant for the present invention.
Figure 2:
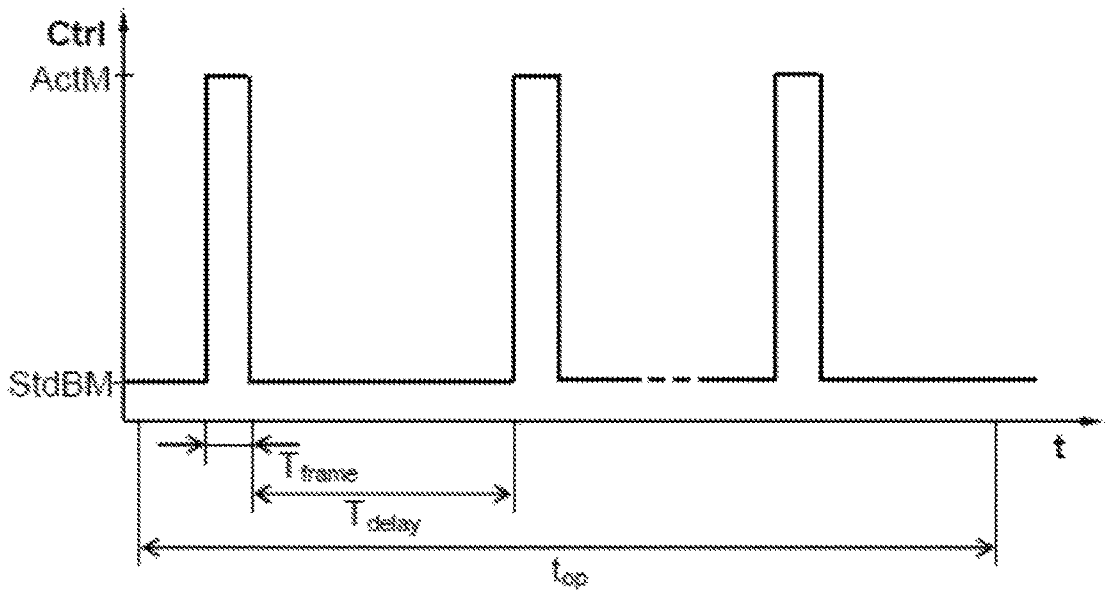
FIG. 2 illustrates, via a graph, how the proposed image sensing apparatus may be controlled to switch between an active mode and a standby mode in a cyclic manner.

Initially, we refer to FIG. 1, which shows an image sensing apparatus according to one embodiment of the invention. FIG. 2 contains a graph showing an example of the control signal Ctrl as a function of time t.

The proposed image sensing apparatus 100 includes a light sensitive area 110, a control unit 120, and preferably an output interface 130.

The light sensitive area 110 is configured to register image data $D_{img}$ in response to an incoming amount of light. Thus, the light sensitive area 110 may for example be implemented in CMOS or CCD technology (CMOS=complementary metal-oxide-semiconductor; CCD=charge-couple device). The light sensitive area 110 contains a set of light sensitive elements, or pixels, which typically are arranged in a matrix containing a first number of columns and a second number of rows. The aspect ratio expresses the relationship between the first and second numbers, and the total number of light sensitive elements in the light sensitive area 110, i.e. the first number multiplied by the second number, is termed the resolution of the light sensitive area 110. In modern eye-tracking solutions, the resolution is often relatively high, for instance in the order of 5 megapixels or more.

A prior art 5 megapixels image sensor, in a “regular”-sensor-operation camera application (supporting video, preview and snapshot) typically consumes at least 250 mW, whereas a VGA sensor normally only consumes 50 mW at 30 frames-per-second operation. However, a VGA readout from a 5 megapixels image sensor still consumes almost 250 mW. This, of course, is not satisfactory.

Therefore, according to the invention, the light sensitive area 110 is operable in an active mode ActM, wherein image data $D_{img}$ can be read out from it; and in a standby mode StdBM in which the light sensitive area 110 has a very low energy consumption. The standby mode StdBM is characterized in that no image data $D_{img}$ can be read out from the light sensitive area 110. However, with very short delay, the light sensitive area 110 can enter the active mode ActM (where such readout is enabled).

The control unit 120 may be co-located with/integrated into a sensor unit containing light sensitive area 110. In such a case, the control unit 120 can be controlled by an external source, so that in response to a signal from this source, image data $D_{img}$ are read out and thereafter the light sensitive area 110 automatically enters the standby mode StdBM.

The control unit 120 is configured to produce a control signal Ctrl for setting the light sensitive area 110 to operate in either the active mode ActM or the standby mode StdBM. Specifically, according to the invention, the control unit 120 is configured to produce the control signal Ctrl such that the light sensitive area 110 operates in the active mode ActM and the standby mode StdBM in a cyclic manner during an operation period $t_{op}$. Here, the operation period $t_{op}$ may correspond to anything from a few data frame cycles to a steady-state operation of the image sensing apparatus 100 extending over a substantial period of time, say several minutes or hours.

The output interface 130 is configured to deliver output image data $D_{img}$ that have been registered by the light sensitive area 110. Normally, the image data $D_{img}$ are read out in the form of data frames DF, where one data frame DF represents readout of the image data $D_{img}$ having been registered by the light sensitive area 110 during a prescribed capture time $T_{frame}$, or exposure time. Further, the output interface 130 is configured to feed out a series of such data frames DF from the light sensitive area 110, which data frames DF represent moving image data of a video sequence at a given frame rate, say 30 Hz.

Preferably, the control unit 120 is configured to produce the control signal Ctrl so that the operation period $t_{op}$ extends over at least one capture time $T_{frame}$ (when the light sensitive area 110 operates in the active mode ActM) and at least two periods during which the light sensitive area 110 operates in the standby mode StdBM.

In some implementations, it is advantageous if the operation period $t_{op}$ extends over at least two capture times $T_{frame}$ during which the light sensitive area 110 operates in the active mode ActM, and where the capture times $T_{frame}$ are separated by a respective delay period $T_{delay}$ during which the light sensitive area 110 operates in the standby mode StdBM.

In FIG. 2, we see an example where the light sensitive area 110 operates in the Active mode ActM at least three times during the operation period $t_{op}$. This may correspond to exclusively reading out image data $D_{img}$ from one or more subsets of light sensitive elements ROI of the light sensitive area 110. Typically, the light sensitive area 110 includes a set of light sensitive elements arranged in a matrix having a first number of columns and a second number of rows. For example, in a 5 megapixel sensor (having in total 5,090,816 light sensitive elements), the first number columns may be 2,608 and the second number of rows may be 1,952.

The light sensitive area 110 is here controllable to read out image data $D_{img}$ to the output interface 130, which image data $D_{img}$ have been registered exclusively by the at least one subset ROI, say 100 rows and 200 columns of the light sensitive area 110. Further, the control unit 120 is configured to produce the control signal Ctrl so that the at least one subset of image data ROI is fed to the output interface 130 when the light sensitive area 110 operates in the active mode ActM, for instance as specified in the diagram of FIG. 2.

To facilitate selecting at least one adequate subset ROI, it is desirable if, prior to the operation period $t_{op}$, the control unit 120 is configured to produce the control signal Ctrl so that the light sensitive area 110 operates in the active mode ActM during an unbroken period of time exceeding a typical capture time $T_{frame}$ associated with a full readout of image data $D_{img}$ from the light sensitive area 110. Thus, an eye-tracking session may be initiated with video recording, wherein image data $D_{img}$ are collected from a relatively large portion, or all, of the light sensitive area 110. Based on this data, it is assumed that the image of one or more eyes of a user can be identified. Then, the subset(s) ROI can be selected such that the image of the eye(s) is included therein. Details concerning how eye/gaze tracking can be effected according to one embodiment of the invention will be described below with reference to FIG. 5.

Naturally, also after having identified one or more eyes in an image sequence it may prove necessary to search for eyes in the recorded image data. For example, if the tracking is temporarily lost due to an obstruction between the user's eyes and the camera, a repeated search must be done.

Therefore, the operation period $t_{op}$ needs to be discontinued. Subsequently, the control unit 120 is configured to produce the control signal Ctrl so that the light sensitive area 110 operates in the active mode ActM during an unbroken period of time exceeding the typical capture time $T_{frame}$ associated with a full readout of image data $D_{img}$ from the light sensitive area 110.

Alternatively, the light sensitive area 110 may be controllable to read out image data $D_{img}$ to the output interface 130 such that data from two or more light sensitive elements are combined with one another to form a common data unit (so-called binning). For example, data from four neighboring light sensitive elements can be combined to form a common data unit. As a result, the sensitivity of the light sensitive area 110 may be increased significantly, and a total number of data units fed to the output interface 130 is reduced to an amount less than the first number times the second number, say the first number times the second number divided by four. Naturally, this, in turn, is beneficial from a bandwidth point-of-view.

According to further embodiments of the invention, various forms of hybrid operation are conceivable involving switching between the above binning-mode operation, subset ROI readout and the standby mode StdBM. For example, first, a subset ROI is read out. Then, follows a frame representing a binned down image (typically larger than the subset ROI, and possibly covering the entire light sensitive area 110). Thereafter, the light sensitive area 110 enters the standby mode StdBM until, again, another subset ROI is read out, and so on in a cyclic manner. Here, the subset ROI may contain image data $D_{img}$ representing one or more eyes, whereas the binned down image may represent the whole face of a subject.

Alternatively, the standby mode StdBM may be inserted between the subset ROI readout and the binned down image readout, or both.

Figure 3:
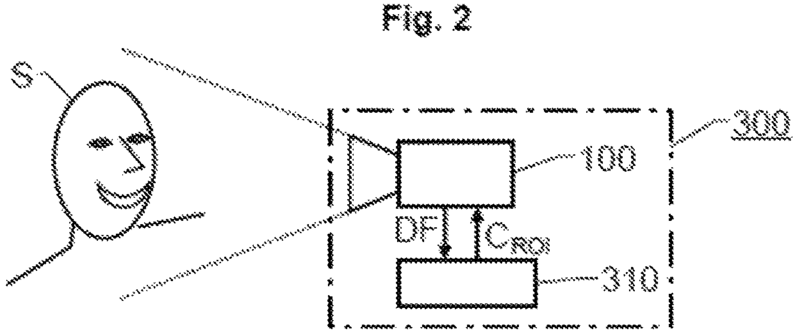
FIG. 3 shows an eye/gaze tracking system according to one embodiment of the invention.

FIG. 3 shows an eye/gaze tracking system 300 according to one embodiment of the invention. The eye/gaze tracking system 300 includes the proposed image sensing apparatus 100 described above, wherein the image sensing apparatus 100 is arranged to capture image data $D_{img}$ of a subject S whose eye and/or gaze is tracked. The control unit 120 is here configured to produce the control signal Ctrl so that the subset of image data ROI represents the image of at least one eye 105 of the subject S.

The control unit 120, in turn, may receive a main control signal $C_{ROI}$ from a data processing unit 310, which is configured to calculate updated eye position estimates based on the data frames DF produced by the image sensing apparatus 100. Normally, the data processing unit 310 is also responsible for deriving estimated gaze data and updates thereof.

Preferably, the control unit 120 contains, or is in communicative connection with a memory unit 125 storing a computer program product PP, which contains software for controlling the control unit 120 to perform the above-described actions when the computer program product PP is run on the control unit 120.

Figure 4:
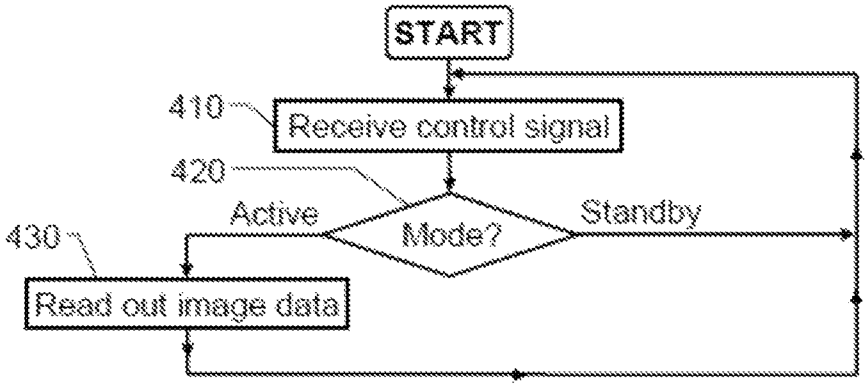
FIG. 4 illustrates, by means of a flow diagram, the general method according to the invention.

In order to sum up, we will now describe the general method of controlling an image sensing apparatus according to the invention with reference to the flow diagram in FIG. 4. The image sensing apparatus has a light sensitive area 110 configured to register image data $D_{img}$ in response to an incoming amount of light. Further, in response to a control signal Ctrl, the light sensitive area 110 is operable in an active mode ActM, wherein image data $D_{img}$ can be read out there from and a standby mode StdBM wherein no image data $D_{img}$ can be read out.

In a first step 410, the control signal Ctrl is received. A subsequent step 420 checks if the control signal specifies that the light sensitive area 110 shall operate in the active mode ActM or the standby mode StdBM. In the former case, a step 430 follows, and in the latter case the procedure loops back to step 410.

In step 430, image data $D_{img}$ are read out from the light sensitive area 110. Then, the procedure loops back to step 410. According to the invention, the control signal Ctrl is produced such that the light sensitive area operates in the active mode ActM and the standby mode StdBM in a cyclic manner during an operation period $t_{op}$, i.e. the procedure loops several repetitions through the steps 410 to 430. Consequently, the light sensitive area 110 is set in the active mode ActM at least once during the operation period $t_{op}$.

Figure 5:
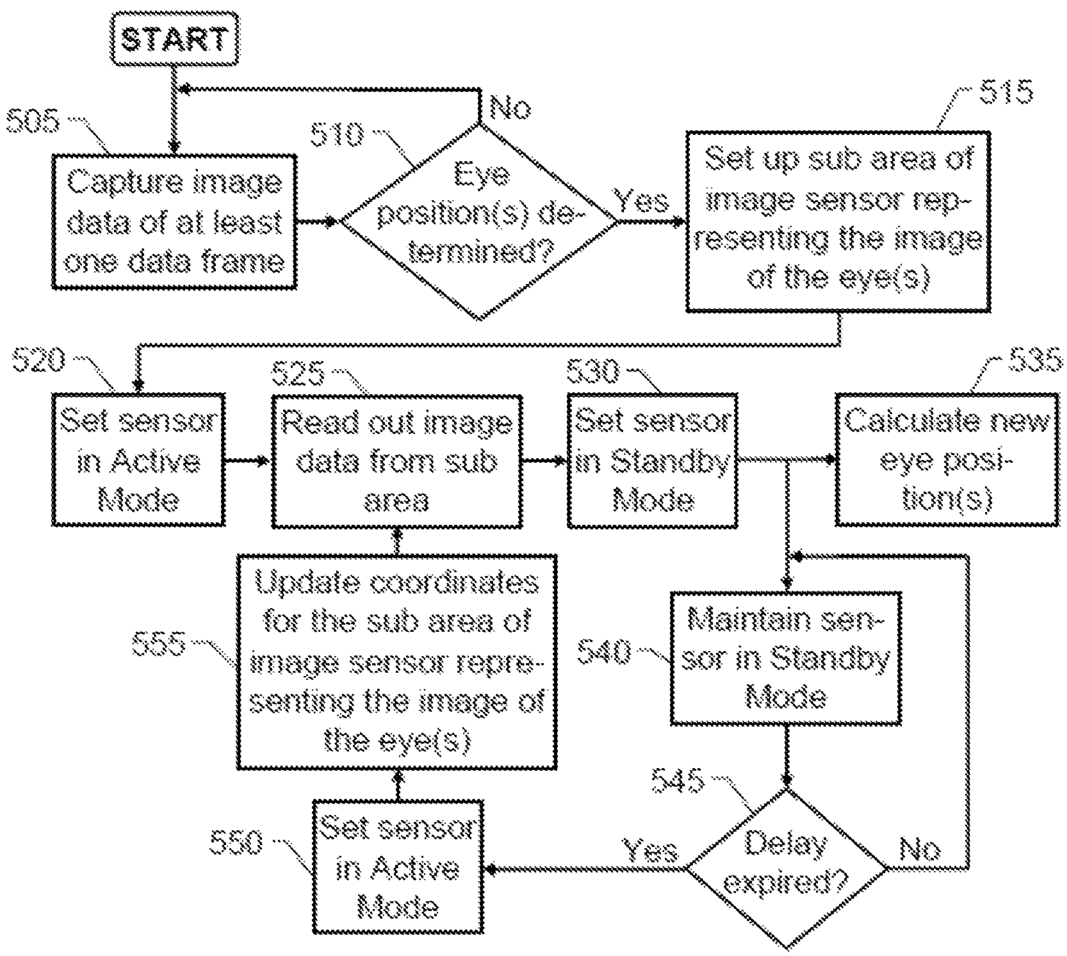
FIG. 5 illustrates, by means of a flow diagram, how the proposed eye/gaze tracking system may operate according to the invention.

Referring to FIG. 5, we will now describe how the proposed eye/gaze tracking system 300 may operate according to one embodiment of the invention.

In a step 505, image data $D_{img}$ are captured in at least one full data frame DF. This means that, prior to the operation period $t_{op}$, the control signal Ctrl is produced in such a manner that the light sensitive area 110 operates in the active mode ActM during an unbroken period of time exceeding the typical capture time $T_{frame}$ associated with a full readout of image data $D_{img}$ from the light sensitive area 110. The main reason for this is to allow the eye/gaze tracking system 300 to identify at least one eye 105 of a subject S in the image data $D_{img}$.

Thereafter, a step 510 checks if the position for at least one eye 105 has been determined. If so, a step 515 follows, and otherwise the procedure loops back to step 505.

It is presumed that the light sensitive area 110 includes a set of light sensitive elements arranged in a first number of columns and a second number of rows. Moreover, the light sensitive area 110 is controllable to read out image data $D_{img}$, which image have been registered exclusively by at least one subset ROI of the first number of columns and/or the second number of rows, i.e. a sub area of the image sensor. In step 515, such a sub area is set up, which represents the image of the at least one eye the position of which was determined in step 510.

Subsequently, in a step 520, the control signal Ctrl is produced so that the image sensor 110 operates in the active mode ActM, Then, in a step 525, image data $D_{img}$ from this sub area are read out through the output interface 130. Thereafter, in a step 530, the light sensitive area 110 is controlled to operate in the standby mode StdBM to economize power until the next image data $D_{img}$ readout.

In order to determine when such image data $D_{img}$ are to be registered, a step 535 calculates a new estimate describing the expected position for the at least one eye 105. Preferably, in connection with this, corresponding gaze data are also calculated. In parallel with step 535, in a step 540, the control signal Ctrl is produced so that the sensor remains in the standby mode StdBM.

Repeatedly, after entering step 540, a step 545 checks if a delay period has expired, which delay period defines a duration until it is time to reactivate the light sensitive area 110. If the delay period has expired, a step 550 follows. Otherwise, the procedure loops back to step 540.

In step 550 it has been determined that it is time to read out another set of image data $D_{img}$ representing the sub area where the at least one eye 105 is expected to be located. Therefore, in step 550, the control signal Ctrl is generated so that the light sensitive area 110 operates in the active mode ActM again. In connection there with, the coordinates for the sub area in question are updated in a following step 555. Then, the procedure returns to step 525 for repeated image data $D_{img}$ readout.

According to embodiments of the invention, step 535 may be executed before step 530. I.e. the updated eye position(s) may be calculated before controlling the light sensitive area 110 to operate in the standby mode StdBM. In fact, if the updated eye position(s) is(are) determined based on a previous image, even step 555 may be effected before step 535.

All of the process steps, as well as any sub-sequence of steps, described with reference to FIGS. 4 and 5 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semi-conductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

This application claim priority from Great Britain Patent Application No. Application No: 1307724.3 filed on Apr. 29, 2013 and entitled: "Power Efficient Image Sensing Apparatus, Method of Operating the Same and Eye/Gaze Tracking System;" the contents of which are incorporated herein by reference.

The invention is not restricted to the described embodiments in the figures, but may be varied freely within the scope of the claims.

What is claimed:

1. An image sensing apparatus comprising:

a light sensitive area configured to register image data in response to an incoming amount of light, the light sensitive area being operable in an active mode wherein image data can be read out there from and a standby mode wherein image data cannot be read out;

a control unit configured to produce a control signal for setting the light sensitive area in the active mode and the standby mode respectively, said control unit configured to produce the control signal such that the light sensitive area transitions from operation in the active mode to the standby mode and back to the active mode in a cyclic manner during an operation period; and an output interface configured to deliver output image data from the light sensitive area, wherein one data frame represents readout of the image data having been registered by the light sensitive area during a capture time, wherein the light sensitive area is configured to feed a sequence of said data frames through the output interface, wherein the control unit is configured to produce the control signal so that the operation period extends over at least one capture time and at least two periods during which the light sensitive area operates in the standby mode, the light sensitive area operating in the active mode during said at least one capture time, and wherein prior to the operation period, the control unit is configured to produce the control signal so that the light sensitive area operates in the active mode during an unbroken period of time exceeding a typical capture time associated with a full readout of image data from the light sensitive area.

2. The image sensing apparatus according to claim 1, wherein the operation period extends over at least two capture times during which the light sensitive area operates in the active mode, said at least two capture times being separated by a respective delay period during which the light sensitive area operates in the standby mode.

3. The image sensing apparatus according to claim 1, wherein the light sensitive area comprises a set of light sensitive elements arranged in a first number of columns and a second number of rows, the light sensitive area is controllable to read out image data to the output interface, which image data have been registered exclusively by at least one subset of the first number of columns and/or the second number of rows, and the control unit is further configured to produce the control signal so that said at least one subset of image data is fed to the output interface when the light sensitive area operates in the active mode.

4. The image sensing apparatus according to claim 1, wherein the light sensitive area comprises a set of light sensitive elements arranged in a first number of columns and a second number of rows, and the light sensitive area is controllable to read out image data to the output interface such that data from two or more light sensitive elements are combined with one another to form a common data unit and a total number of said data units fed to the output interface is less than the first number times the second number.

5. An image sensing apparatus comprising:

a light sensitive area configured to register image data in response to an incoming amount of light, the light sensitive area being operable in an active mode wherein image data can be read out there from and a standby mode wherein image data cannot be read out;

a control unit configured to produce a control signal for setting the light sensitive area in the active mode and the standby mode respectively, said control unit configured to produce the control signal such that the light sensitive area transitions from operation in the active mode to the standby mode and back to the active mode in a cyclic manner during an operation period; and an output interface configured to deliver output image data from the light sensitive area, wherein one data frame represents readout of the image data having been registered by the light sensitive area during a capture time, wherein the light sensitive area is configured to feed a sequence of said data frames through the output interface, wherein the control unit is configured to produce the control signal so that the operation period extends over at least one capture time and at least two periods during which the light sensitive area operates in the standby mode, the light sensitive area operating in the active mode during said at least one capture time, and wherein after the operation period, the control unit is configured to produce the control signal so that the light sensitive area operates in the active mode during an unbroken period of time exceeding a typical capture time associated with a full readout of image data from the light sensitive area.

6. The image sensing apparatus according to claim 5, wherein the operation period extends over at least two capture times during which the light sensitive area operates in the active mode, said at least two capture times being separated by a respective delay period during which the light sensitive area operates in the standby mode.

7. The image sensing apparatus according to claim 5, wherein the light sensitive area comprises a set of light sensitive elements arranged in a first number of columns and a second number of rows, the light sensitive area is controllable to read out image data to the output interface, which image data have been registered exclusively by at least one subset of the first number of columns and/or the second number of rows, and the control unit is further configured to produce the control signal so that said at least one subset of image data is fed to the output interface when the light sensitive area operates in the active mode.

8. The image sensing apparatus according to claim 5, wherein the light sensitive area comprises a set of light sensitive elements arranged in a first number of columns and a second number of rows, and the light sensitive area is controllable to read out image data to the output interface such that data from two or more light sensitive elements are combined with one another to form a common data unit and a total number of said data units fed to the output interface is less than the first number times the second number.

9. An eye/gaze tracking system comprising an image sensing apparatus, said image sensing apparatus comprising:

a light sensitive area configured to register image data in response to an incoming amount of light, the light sensitive area being operable in an active mode wherein image data can be read out there from and a standby mode wherein image data cannot be read out, wherein the light sensitive area comprises a set of light sensitive elements arranged in a first number of columns and a second number of rows, and wherein the light sensitive area is controllable to read out image data to an output interface, which image data have been registered exclusively by at least one sub-set of the first number of columns and/or the second number of rows;

a control unit configured to produce a control signal for setting the light sensitive area in the active mode and the standby mode respectively, said control unit configured to produce the control signal such that the light sensitive area transitions from operation in the active mode to the standby mode and back to the active mode in a cyclic manner during an operation period, wherein the control unit is further configured to produce the control signal so that said at least one subset of image data is fed to the output interface when the light sensitive area operates in the active mode; and an output interface configured to deliver output image data from the light sensitive area, wherein one data frame represents readout of the image data having been registered by the light sensitive area during a capture time, wherein the light sensitive area is configured to feed a sequence of said data frames through the output interface, wherein the control unit is configured to produce the control signal so that the operation period extends over at least one capture time and at least two periods during which the light sensitive area operates in the standby mode, the light sensitive area operating in the active mode during said at least one capture time, wherein prior to the operation period, the control unit is configured to produce the control signal so that the light sensitive area operates in the active mode during an unbroken period of time exceeding a typical capture time associated with a full readout of image data from the light sensitive area, wherein the image sensing apparatus being arranged to capture image data of a subject whose eye and or gaze is tracked, and wherein the control unit is configured to produce the control signal so that said at least one subset of image data represents the image of at least one eye of the subject.

10. A method of controlling an image sensing apparatus having a light sensitive area configured to register image data in response to an incoming amount of light, the light sensitive area being operable in an active mode wherein image data can be read out there from and a standby mode wherein image data cannot be read out, and said image sensing apparatus further having an output interface configured to deliver output image data from the light sensitive area; the method comprising:

producing a control signal for setting the light sensitive area in the active mode and the standby mode respectively;

producing the control signal such that the light sensitive area transitions from operation in the active mode to the standby mode and back to the active mode in a cyclic manner during an operation period;

reading out one data frame representing image data having been registered by the light sensitive area during a capture time;

feeding out a sequence of said data frames from the light sensitive area through the output interface; and producing the control signal so that the operation period extends over at least one capture time and at least two periods during which the light sensitive area operates in the standby mode, the light sensitive area operating in the active mode during said at least one capture time, wherein, prior to the operation period, said producing comprises producing the control signal so that the light sensitive area operates in the active mode during an unbroken period of time exceeding a typical capture time associated with a full readout of image data from the light sensitive area.

11. The method according to claim 10, comprising producing the control signal so that the operation period extends over at least two capture times during which the light sensitive area operates in the active mode, said at least two capture times being separated by a respective delay period during which the light sensitive area operates in the standby mode.

12. The method according to claim 10, wherein the light sensitive area comprises a set of light sensitive elements arranged in a first number of columns and a second number of rows, and the method further comprises:

reading out image data from the light sensitive area to the output interface, which image data have been registered exclusively by at least one subset of the first number of columns and/or the second number of rows; and producing the control signal so that said at least one subset of image data is fed to the output interface when the light sensitive area operates in the active mode.

13. The method according to claim 10, wherein the light sensitive area comprises a set of light sensitive elements arranged in a first number of columns and a second number of rows, and the method further comprises:

reading out image data from the light sensitive area to the output interface such that data from two or more light sensitive elements are combined with one another to form a common data unit and a total number of said data units fed to the output interface is less than the first number times the second number.

14. A computer program product stored on a non-transitory computer readable medium, comprising software instructions for operation by a computer controller for controlling an image sensing apparatus having a light sensitive area configured to register image data in response to an incoming amount of light, the light sensitive area being operable in an active mode wherein image data can be read out there from and a standby mode wherein image data cannot be read out, and said image sensing apparatus further having an output interface configured to deliver output image data from the light sensitive area, said instructions comprising:

first instructions for producing a control signal for setting the light sensitive area in the active mode and the standby mode respectively;

second instructions for producing the control signal such that the light sensitive area transitions from operation in the active mode to the standby mode and back to the active mode in a cyclic manner during an operation period;

third instructions for reading out one data frame representing image data having been registered by the light sensitive area during a capture time; and fourth instructions for feeding out a sequence of said data frames from the light sensitive area through the output interface, wherein said second instructions includes instructions for producing the control signal so that the operation period extends over at least one capture time and at least two periods during which the light sensitive area operates in the standby mode, the light sensitive area operating in the active mode during said at least one capture time, and wherein said second instructions comprising, prior to the operation period, instructions for producing the control signal so that the light sensitive area operates in the active mode during an unbroken period of time exceeding a typical capture time associated with a full readout of image data from the light sensitive area.

15. The computer program product of claim 14, wherein said second instructions comprises instructions for producing the control signal so that the operation period extends over at least two capture times during which the light sensitive area operates in the active mode, said at least two capture times being separated by a respective delay period during which the light sensitive area operates in the standby mode.

16. The computer program product of claim 14, wherein the light sensitive area comprises a set of light sensitive elements arranged in a first number of columns and a second number of rows, wherein said third instructions comprises instructions for reading out image data from the light sensitive area to the output interface, which image data have been registered exclusively by at least one subset of the first number of columns and/or the second number of rows, and said second instructions comprises instructions for producing the control signal so that said at least one subset of image data is fed to the output interface when the light sensitive area operates in the active mode.

17. The computer program product of claim 14, wherein the light sensitive area comprises a set of light sensitive elements arranged in a first number of columns and a second number of rows, and the method further comprises:

second instructions for reading out image data from the light sensitive area to the output interface such that data from two or more light sensitive elements are combined with one another to form a common data unit and a total number of said data units fed to the output interface is less than the first number times the second number.

18. An eye/gaze tracking system comprising an image sensing apparatus, said image sensing apparatus comprising:

a light sensitive area configured to register image data in response to an incoming amount of light, the light sensitive area being operable in an active mode wherein image data can be read out there from and a standby mode wherein image data cannot be read out, wherein the light sensitive area comprises a set of light sensitive elements arranged in a first number of columns and a second number of rows, and wherein the light sensitive area is controllable to read out image data to an output interface, which image data have been registered exclusively by at least one sub-set of the first number of columns and/or the second number of rows;

a control unit configured to produce a control signal for setting the light sensitive area in the active mode and the standby mode respectively, said control unit configured to produce the control signal such that the light sensitive area transitions from operation in the active mode to the standby mode and back to the active mode in a cyclic manner during an operation period, wherein the control unit is further configured to produce the control signal so that said at least one subset of image data is fed to the output interface when the light sensitive area operates in the active mode; and an output interface configured to deliver output image data from the light sensitive area, wherein one data frame represents readout of the image data having been registered by the light sensitive area during a capture time, wherein the light sensitive area is configured to feed a sequence of said data frames through the output interface, wherein the control unit is configured to produce the control signal so that the operation period extends over at least one capture time and at least two periods during which the light sensitive area operates in the standby mode, the light sensitive area operating in the active mode during said at least one capture time, wherein after the operation period, the control unit is configured to produce the control signal so that the light sensitive area operates in the active mode during an unbroken period of time exceeding a typical capture time associated with a full readout of image data from the light sensitive area, wherein the image sensing apparatus being arranged to capture image data of a subject whose eye and or gaze is tracked, and wherein the control unit is configured to produce the control signal so that said at least one subset of image data represents the image of at least one eye of the subject.

19. A method of controlling an image sensing apparatus having a light sensitive area configured to register image data in response to an incoming amount of light, the light sensitive area being operable in an active mode wherein image data can be read out there from and a standby mode wherein image data cannot be read out, and said image sensing apparatus further having an output interface configured to deliver output image data from the light sensitive area; the method comprising:

producing a control signal for setting the light sensitive area in the active mode and the standby mode respectively;

producing the control signal such that the light sensitive area transitions from operation in the active mode to the standby mode and back to the active mode in a cyclic manner during an operation period;

reading out one data frame representing image data having been registered by the light sensitive area during a capture time;

feeding out a sequence of said data frames from the light sensitive area through the output interface; and producing the control signal so that the operation period extends over at least one capture time and at least two periods during which the light sensitive area operates in the standby mode, the light sensitive area operating in the active mode during said at least one capture time, wherein, after the operation period, said producing comprises producing the control signal so that the light sensitive area operates in the active mode during an unbroken period of time exceeding a typical capture time associated with a full readout of image data from the light sensitive area.

20. The method according to claim 19, comprising producing the control signal so that the operation period extends over at least two capture times during which the light sensitive area operates in the active mode, said at least two capture times being separated by a respective delay period during which the light sensitive area operates in the standby mode.

21. The method according to claim 19, wherein the light sensitive area comprises a set of light sensitive elements arranged in a first number of columns and a second number of rows, and the method further comprises:

reading out image data from the light sensitive area to the output interface, which image data have been registered exclusively by at least one subset of the first number of columns and/or the second number of rows; and producing the control signal so that said at least one subset of image data is fed to the output interface when the light sensitive area operates in the active mode.

22. The method according to claim 19, wherein the light sensitive area comprises a set of light sensitive elements arranged in a first number of columns and a second number of rows, and the method further comprises:

reading out image data from the light sensitive area to the output interface such that data from two or more light sensitive elements are combined with one another to form a common data unit and a total number of said data units fed to the output interface is less than the first number times the second number.

23. A computer program product stored on a non-transitory computer readable medium, comprising software instructions for operation by a computer controller for controlling an image sensing apparatus having a light sensitive area configured to register image data in response to an incoming amount of light, the light sensitive area being operable in an active mode wherein image data can be read out there from and a standby mode wherein image data cannot be read out, and said image sensing apparatus further having an output interface configured to deliver output image data from the light sensitive area, said instructions comprising:

first instructions for producing a control signal for setting the light sensitive area in the active mode and the standby mode respectively;

second instructions for producing the control signal such that the light sensitive area transitions from operation in the active mode to the standby mode and back to the active mode in a cyclic manner during an operation period;

third instructions for reading out one data frame representing image data having been registered by the light sensitive area during a capture time; and fourth instructions for feeding out a sequence of said data frames from the light sensitive area through the output interface, wherein said second instructions includes instructions for producing the control signal so that the operation period extends over at least one capture time and at least two periods during which the light sensitive area operates in the standby mode, the light sensitive area operating in the active mode during said at least one capture time, and wherein said second instructions comprising, after the operation period, instructions for producing the control signal so that the light sensitive area operates in the active mode during an unbroken period of time exceeding a typical capture time associated with a full readout of image data from the light sensitive area.

24. The computer program product of claim 23, wherein said second instructions comprises instructions for producing the control signal so that the operation period extends over at least two capture times during which the light sensitive area operates in the active mode, said at least two capture times being separated by a respective delay period during which the light sensitive area operates in the standby mode.

25. The computer program product of claim 23, wherein the light sensitive area comprises a set of light sensitive elements arranged in a first number of columns and a second number of rows, wherein said third instructions comprises instructions for reading out image data from the light sensitive area to the output interface, which image data have been registered exclusively by at least one subset of the first number of columns and/or the second number of rows, and said second instructions comprises instructions for producing the control signal so that said at least one subset of image data is fed to the output interface when the light sensitive area operates in the active mode.

26. The computer program product of claim 23, wherein the light sensitive area comprises a set of light sensitive elements arranged in a first number of columns and a second number of rows, and the method further comprises:

second instructions for reading out image data from the light sensitive area to the output interface such that data from two or more light sensitive elements are combined with one another to form a common data unit and a total number of said data units fed to the output interface is less than the first number times the second number.

* * * * *